(12) United States Patent
Jung et al.

(10) Patent No.: US 10,718,131 B2
(45) Date of Patent: Jul. 21, 2020

(54) VEHICLE TENT

(71) Applicants: Goo Seung Jung, Daejeon (KR); Seo Ha Park, Daejeon (KR)

(72) Inventors: Goo Seung Jung, Daejeon (KR); Seo Ha Park, Daejeon (KR)

( * ) Notice: Subject to any disclaimer, the term of this patent is extended or adjusted under 35 U.S.C. 154(b) by 0 days.

(21) Appl. No.: 16/216,080

(22) Filed: Dec. 11, 2018

(65) Prior Publication Data

US 2020/0181935 A1 Jun. 11, 2020

(51) Int. Cl.
| | |
|---|---|
| *E04H 15/06* | (2006.01) |
| *B60P 3/34* | (2006.01) |
| *E04H 15/50* | (2006.01) |
| *A45F 3/52* | (2006.01) |
| *E04H 15/54* | (2006.01) |

(52) U.S. Cl.
CPC .............. *E04H 15/06* (2013.01); *A45F 3/52* (2013.01); *B60P 3/34* (2013.01); *E04H 15/505* (2013.01); *E04H 15/54* (2013.01); *B32B 2307/7265* (2013.01)

(58) Field of Classification Search
CPC ......... E04H 15/02; E04H 15/06; E04H 15/64; E04H 15/322; E04H 15/54; B60P 3/34; B60P 3/341; B60P 3/32; A45F 3/52
USPC ...... 135/88.05–88.09, 88.15–88.17, 96, 115, 135/119, 120.4; 296/26.11, 159, 163, 296/165–167, 173
See application file for complete search history.

(56) References Cited

U.S. PATENT DOCUMENTS 4,504,049 A * 3/1985 Straub ..................... B60P 3/341
135/88.16
5,226,689 A * 7/1993 Roe .......................... B60P 3/34
296/159
(Continued)

FOREIGN PATENT DOCUMENTS

JP 02248585 A * 10/1990 ............. E04H 15/06

*Primary Examiner* — Winnie Yip
(74) *Attorney, Agent, or Firm* — Sughrue Mion, PLLC (57) ABSTRACT

The invention relates to a vehicle tent, and the vehicle tent comprises a waterproof sheet that makes up an outer cover of the vehicle tent, comprising a opening part forming a opening rearward, where the opening part connects to each of the rear door, rear panel, and bumper panel, a tent fixture devices that are embedded at a tip of the opening part, by which using the predetermined elastic force of the waterproof sheet, an upper surface of the opening part covers a back surface of the rear door, being inserted and combined to the rear door, where two sides of the opening part is inserted and combined to a gap formed at the rear panel, and where a bottom surface of the opening part is inserted and combined to the inner side of the bumper panel, a blocking sheet that is connected to the waterproof sheet inwardly, where an upper surface is inserted to a gap between the rear door and rear panel, where two sides cover sides of the rear panel, where a bottom surface covers a bottom surface of the rear panel and an upper surface of the bumper panel, and a open-close sheet where an upper surface connects to the waterproof sheet, where two sides and a bottom surface connect to an open-close device allowing it to open and close, where an insect screen and a shade canopy may individually be connected to an open-close device allowing them to open and close.

11 Claims, 11 Drawing Sheets

(56) References Cited

U.S. PATENT DOCUMENTS

| | | | | |
|---|---|---|---|---|
| 5,358,298 A * | 10/1994 | Fate | ................. | B60P 3/38 |
| | | | | 296/159 |
| 5,669,655 A * | 9/1997 | Hammond | ............ | B60J 1/2011 |
| | | | | 296/165 |
| 5,921,614 A * | 7/1999 | Biedermann | ........... | E04H 15/06 |
| | | | | 108/44 |
| 5,934,726 A * | 8/1999 | Bossett | ................... | B60P 3/341 |
| | | | | 135/88.13 |
| 6,070,925 A * | 6/2000 | Moldofsky | ............. | E04H 15/06 |
| | | | | 135/88.13 |
| 6,871,896 B1 * | 3/2005 | Owen | .................... | E04H 15/06 |
| | | | | 135/88.05 |
| 7,396,064 B2 * | 7/2008 | Hicks | ...................... | B60P 3/341 |
| | | | | 296/26.01 |
| 9,834,951 B1 * | 12/2017 | Townley | ................. | E04H 15/06 |
| 2009/0090406 A1 * | 4/2009 | Maximilien | ............ | E04H 15/06 |
| | | | | 135/88.13 |
| 2010/0024633 A1 * | 2/2010 | Piscitelli | ................. | F41H 7/044 |
| | | | | 89/36.02 |

* cited by examiner

VEHICLE TENT

BACKGROUND

1. Field

This invention is on a vehicle tent. Specifically, this invention is a vehicle tent that not only can be installed easily at the vehicle's rear door (tailgate) without the need for separate tent fasteners, but also allowing the mobility of the vehicle with the tent installed. Moreover, the tent covers the open rear door upon installation, completely blocking the inside of the vehicle from the outside, as a result, totally preventing pests from entering the vehicle through the gap between the rear door and the tent.

2. Description of the Related Art

Leisure Recreational vehicle tents, commonly installed with support on the roof rail or the hatchback door, are placed around the vehicle in order to secure a fixed resting area, creating shelter from rain or sun. However, traditional leisure vehicle tents require fixing supports on different sides, or require the insertion of poles inside the tents in order to maintain the form of the tent. Consequently, the same requires the process of dismantling and removing numerous supports or poles, thus having issues on the difficulty and inconvenience in the installation and removal of the tent.

Particularly, a considerable sales has been made on auto camping tents for hatchback leisure recreational vehicles. However, majority of these tents are vehicle tents structured to be installed on the vehicle roof that not only provides limited interior space, but also creates inconvenience in accessing the space as the tent is installed on top of the roof. In view of that, Korea's public patent No. 10-2005-0035657 elaborates on the leisure recreational vehicle tent with distinct features such as the tent being supported on the vehicle ceiling and open hatchback door; with controllable supports that can be retracted and extended similar to a whip antenna; with multiple telescoping poles, each having fastening rings on its boundaries to hold the desired length; with tent support poles installed on the tip of the aforementioned poles, consisting of multiple pressure packing that can be vacuum compressed on top of the ceiling or the top of the hatchback door; with installations made on the top part of the aforementioned tent support poles; being equipped with elastic bands connected with hooks on both poles that may be suspended on the rear wheels of the vehicle; and with tent fabrics equipped with elastic bands connected to both poles where the packs of the poles can be mounted and fixed on the surface of the opposite side.

However, according to the traditional method stated above, when camping with the hatchback door of the leisure recreational vehicle open, there arises the problem of wind, rain and pests entering inside the vehicle.

SUMMARY

An exemplary embodiment of the invention provides a vehicle tent comprising a waterproof sheet that makes up an outer cover of the vehicle tent, comprising a opening part forming a opening rearward, where the opening part connects to each of the rear door, rear panel, and bumper panel, a tent fixture devices that are embedded at a tip of the opening part, by which using the predetermined elastic force of the waterproof sheet, an upper surface of the opening part covers a back surface of the rear door, being inserted and combined to the rear door, where two sides of the opening part is inserted and combined to a gap formed at the rear panel, and where a bottom surface of the opening part is inserted and combined to the inner side of the bumper panel, a blocking sheet that is connected to the waterproof sheet inwardly, where an upper surface is inserted to a gap between the rear door and rear panel, where two sides cover sides of the rear panel, where a bottom surface covers a bottom surface of the rear panel and an upper surface of the bumper panel, and an open-close sheet where an upper surface connects to the waterproof sheet, where two sides and a bottom surface connect to an open-close device allowing it to open and close, where an insect screen and a shade canopy may individually be connected to an open-close device allowing them to open and close.

In an exemplary embodiment of the invention provides a vehicle further comprising an extended sheet extended from the blocking sheet, being inserted in the gap between the rear door and the rear panel, therefore the extended sheet can be attached and detached from the borders of a tip of the rear panel, and an attachment devices for the extended sheet.

In an exemplary embodiment one of the open-close sheet, the insect screen or the shade canopy can be opened or closed, or the open-close sheet, the insect screen and the shade canopy can be opened or closed simultaneously.

In an exemplary embodiment the open-close sheet comprises connectors connecting ends of the open-close sheet to ends of the waterproof sheet, the connectors comprises a wire roller where a connecting wire connected to the waterproof sheet is coiled and uncoiled, an upper tip of the waterproof sheet comprises a connecting buttons connecting the connecting wire In an exemplary embodiment the waterproof sheet comprises a window canopy, the window canopy is placed overlapping a window of the rear door, the window canopy is transparent in color and contains urethane In an exemplary embodiment an exposure groove is formed at the waterproof sheet, exposing a part of the vehicle body, a backlight of the vehicle tail lamps is exposed by the exposure groove.

An exemplary embodiment of the invention provides a vehicle tent comprising a waterproof sheet that makes up an outer cover of the vehicle tent, comprising an opening part forming an opening rearward, where the opening part connects to each of the rear door, rear panel, and bumper panel, a tent fixture devices that are embedded at a tip of the opening part, by which using the predetermined elastic force of the waterproof sheet, an upper surface of the opening part covers a back surface of the rear door, being inserted and combined to the rear door, where two sides of the opening part is inserted and combined to a gap formed at the rear panel, and where a bottom surface of the opening part is inserted and combined to the inner side of the bumper panel, a blocking sheet that is connected to the waterproof sheet inwardly, where an upper surface is inserted to a gap between the rear door and rear panel, where two sides cover sides of the rear panel, where a bottom surface covers a bottom surface of the rear panel and an upper surface of the bumper panel, and an open-close sheet where an upper surface connects to the waterproof sheet, where two sides and a bottom surface connect to an open-close device allowing it to open and close, where an insect screen and a transparent cover may individually be connected to an open-close device allowing them to open and close.

In an exemplary embodiment, the insect screen is in the form of mesh, the transparent cover combines urethane, the open-close sheet is located at the outermost side among the open-close sheet, the insect screen and the transparent cover, the transparent cover is located between the open-close sheet and the insect screen.

In an exemplary embodiment, the insect screen is in the form of mesh, the transparent cover combines urethane, the transparent cover is located at the outermost side among the open-close sheet, the insect screen and the transparent cover, the open-close sheet is located between the insect screen and the transparent cover.

In an exemplary embodiment, the insect screen is in the form of mesh, the transparent cover combines urethane, and the waterproof sheet combines urethane.

An exemplary embodiment of the invention provides a vehicle tent installed in a vehicle, wherein the vehicle comprises a rear door and a rear frame connected to the rear door, the rear frame comprises a rear panel and a bumper panel, and the vehicle tent comprises a waterproof sheet that makes up an outer cover of the vehicle tent, comprising an opening part forming an opening rearward, where the opening part connects to the rear frame when the rear door is open, and located between the rear door and the rear frame, a tent fixture devices that are embedded at a tip of the opening part, wherein using the predetermined elastic force of the waterproof sheet, an upper surface of the opening part cover an upper surface of the rear panel, two sides of the opening part is inserted and combined to a gap formed at the rear panel and a bottom surface of the opening part is inserted and combined to an inner side of the bumper panel, a blocking sheet that is connected to the waterproof sheet inwardly, where an upper surface is inserted to a gap between the rear door and the rear frame, where two sides cover sides of the rear panel, where a bottom surface covers an upper surface of the bumper panel, and an open-close sheet where an upper surface connects to the waterproof sheet, where two sides and a bottom surface connect to an open-close device allowing it to open and close, where an insect screen and a shade canopy may individually be connected to an open-close device allowing them to open and close.

DESCRIPTION OF THE EMBODIMENTS

Stated below are the detailed explanation reference to the attached drawings of the advisable model of this invention.

Foremost, in adding the reference symbols for the components of each drawing, it must be noted that the same symbol must be represented for the same components although indicated in a different drawing. Moreover, in explaining this invention, when it is deemed that the detailed explanation of the disclosed elements or the function blurs the substance of this invention, the detailed explanation shall be omitted.

Furthermore, in explaining the components of this invention, terms such as First, Second, A, B, a, b, and others may be used. These terminologies are intended only to classify one component from another, and do not limit the nature, order or sequence of the component to which the terminologies take reference. When it is stated that a certain component is "connected", "attached" or "joined" to another component, that certain component may be directly connected or joined, however, it should be understood that a different component may be "connected", "attached", or "joined" between each components.

Figure 1:
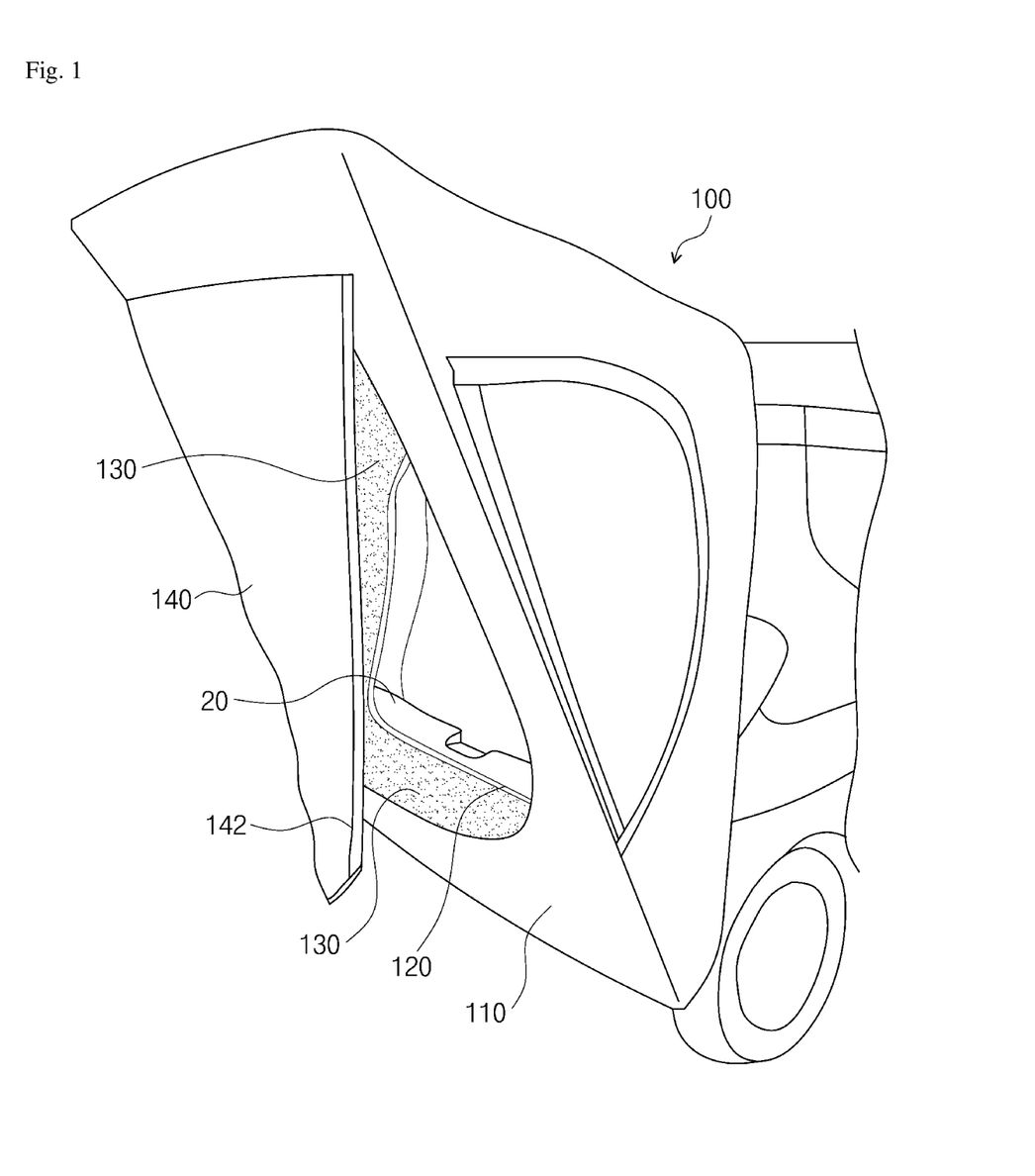
FIG. 1 is a drawing of the vehicle tent installed in accordance with the first model.
Figure 2A:
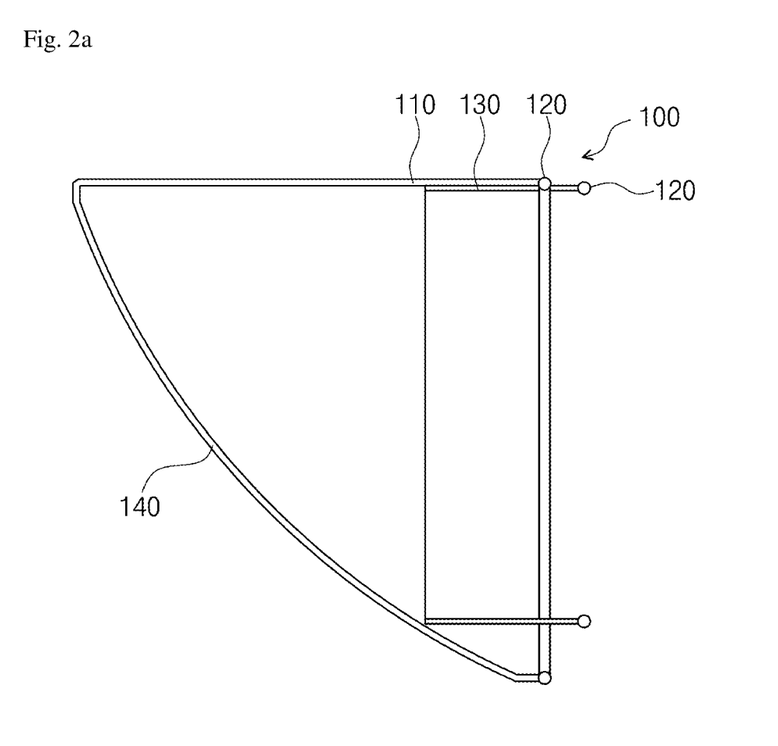
FIGS. 2a and 2b are drawings of the structure of the sheets of the vehicle tent in accordance with the first model of this invention.
Figure 2B:
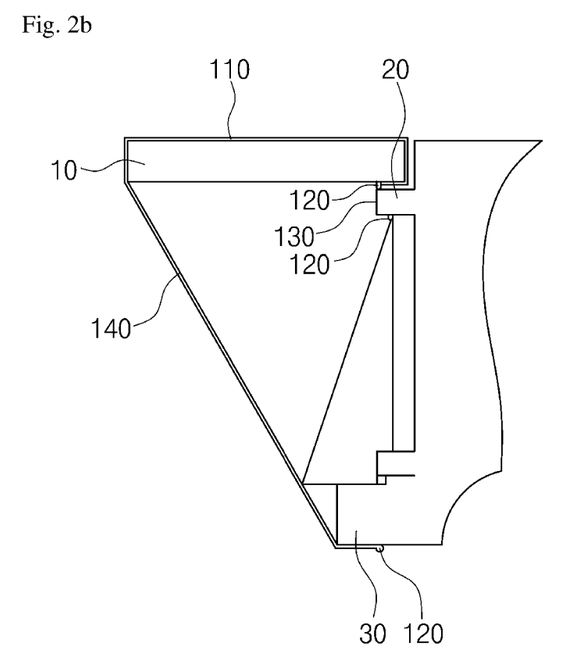
Figure 3:
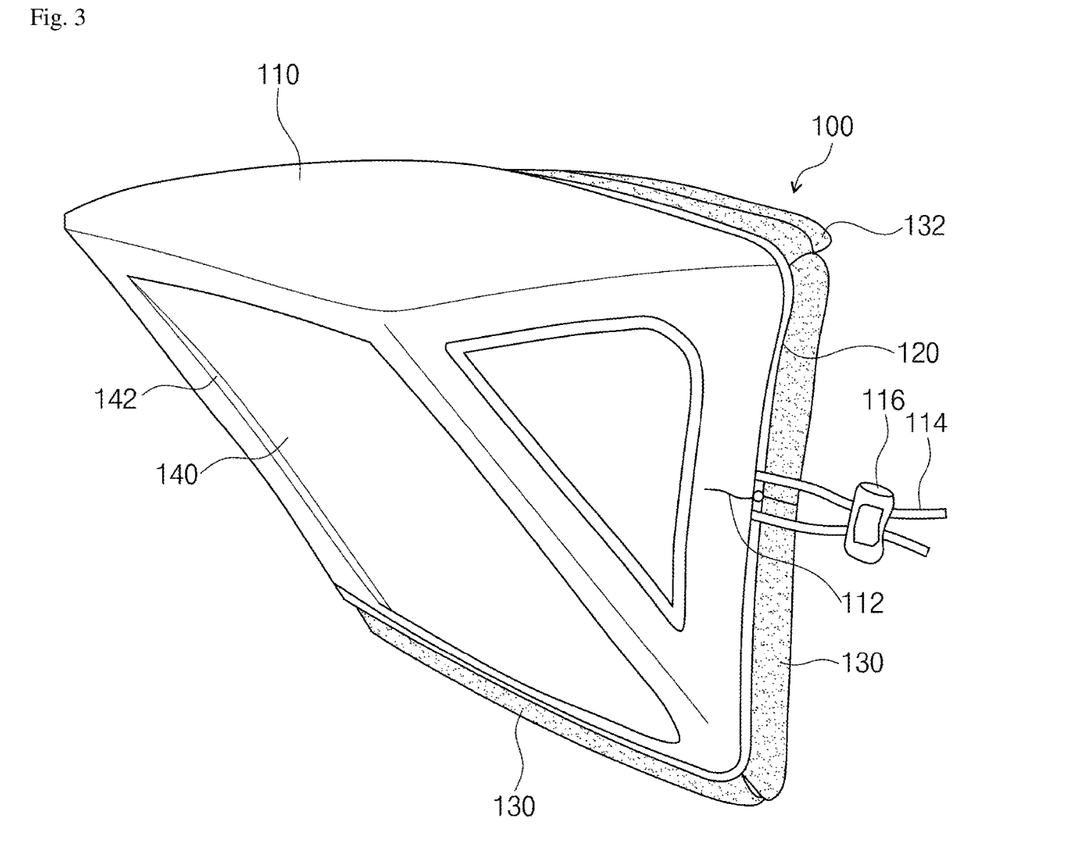
FIGS. 3 and 4 are drawings of the perspective view and the cross section of the vehicle tent in accordance with the second model of this invention.
Figure 4:
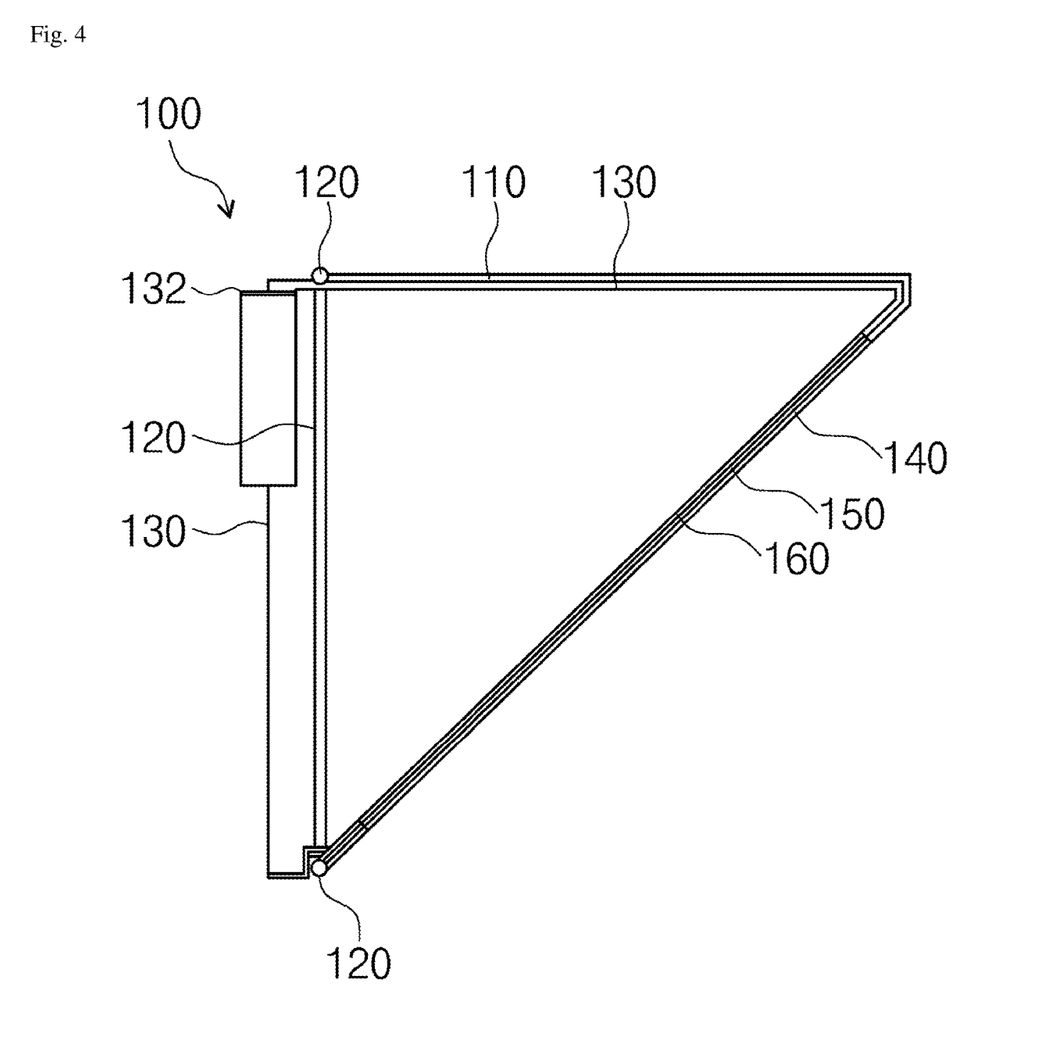
Figure 5:
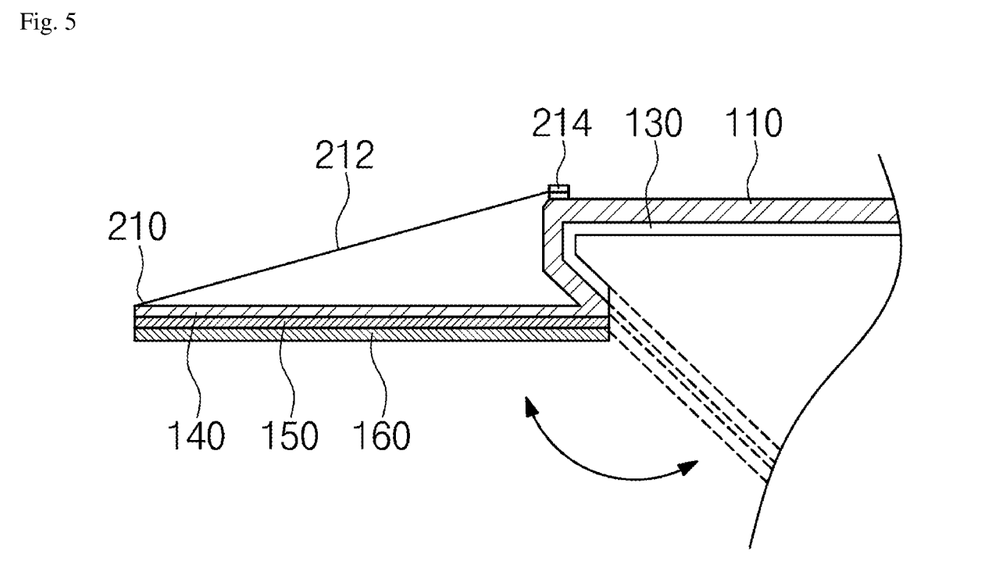
FIG. 5 is a drawing of the fixed structure of the open-close sheet of the vehicle tent in accordance with this invention.
Figure 6:
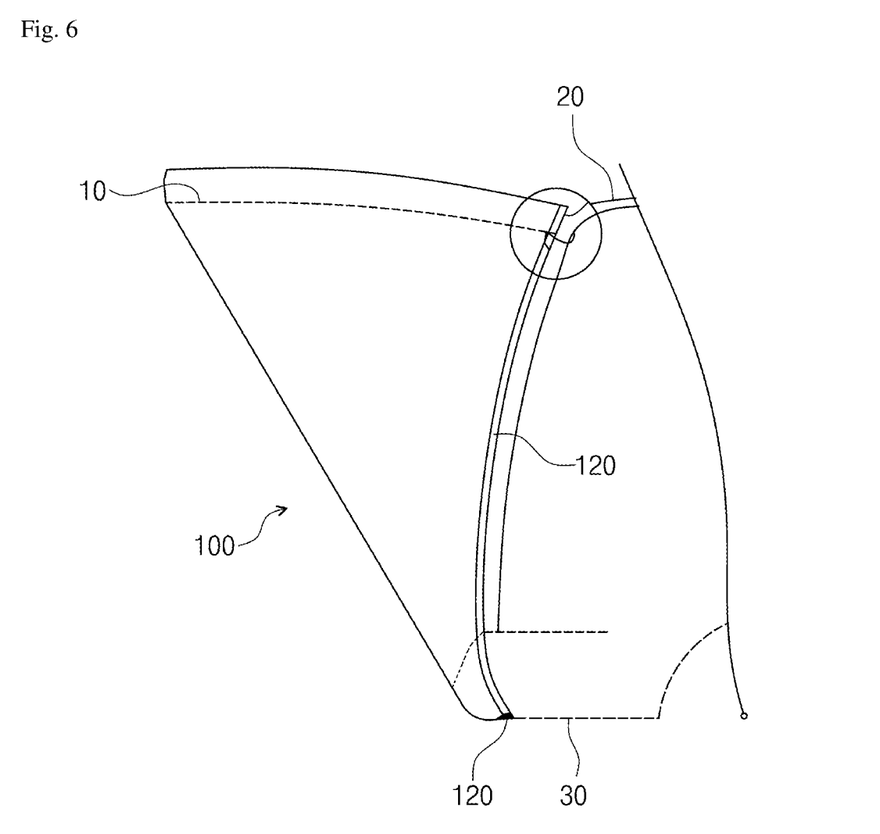
FIG. 6 is an illustration of the installed vehicle tent in accordance with the second model of this invention.
Figure 9:
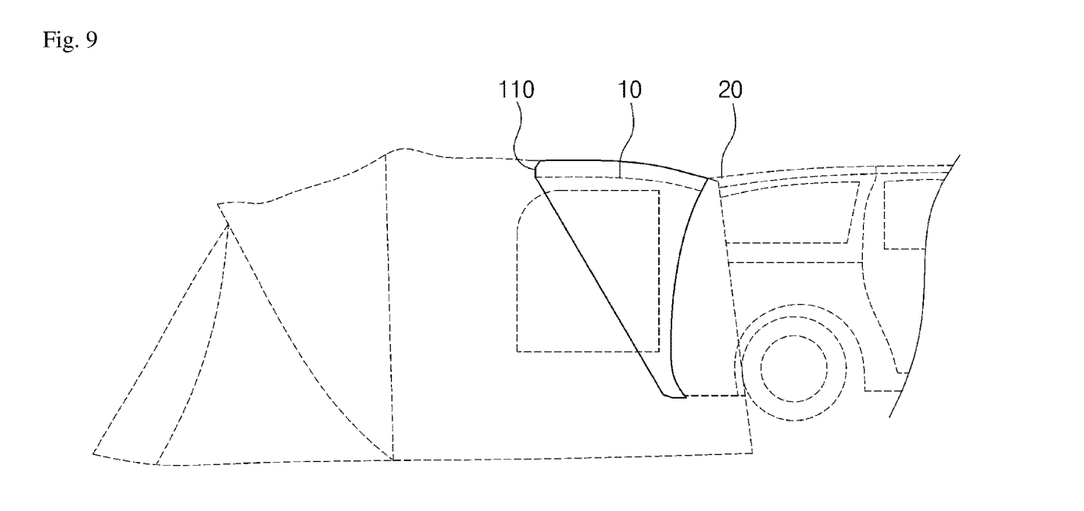
Figure 10:
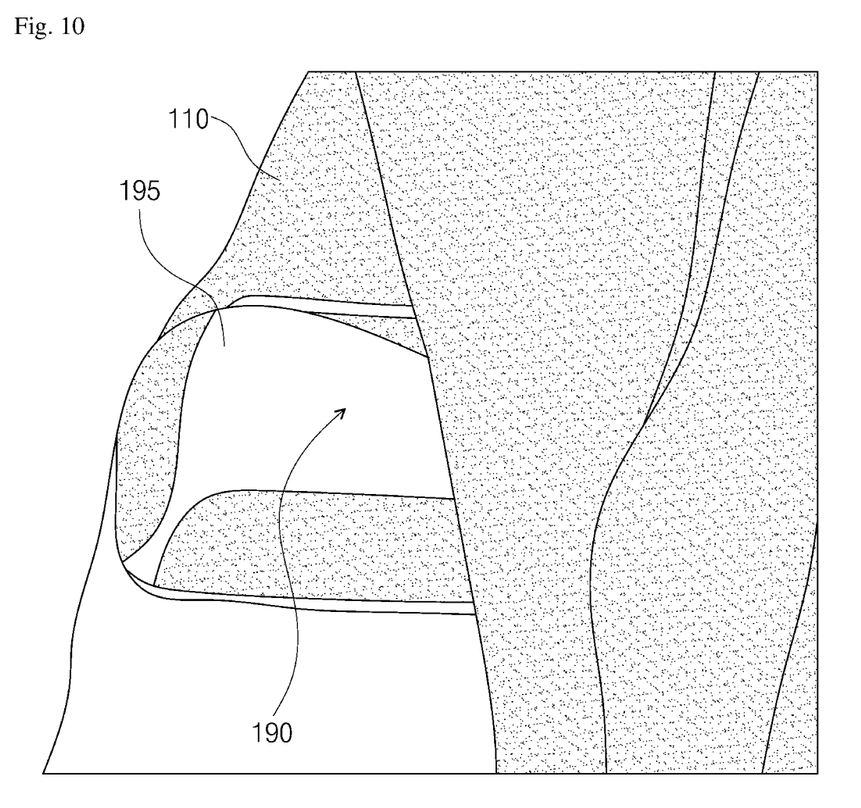
FIG. 10 is a drawing to describe the structure of the waterproof sheet in accordance with the third model of this invention.
Figure 11:
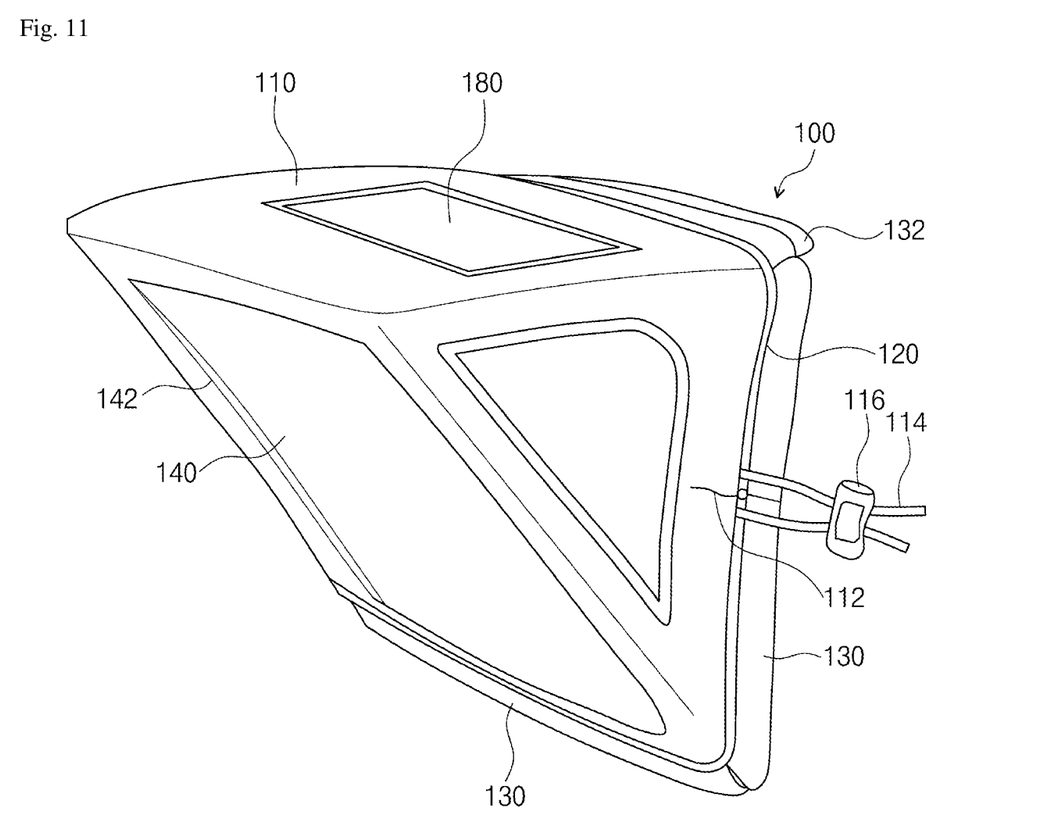
FIG. 11 is a perspective view of the vehicle tent in accordance with the fourth model of this invention.

FIG. 1 is a drawing of the vehicle tent installed in accordance with the first model. FIGS. 2a and 2b are drawings of the structure of the sheets of the vehicle tent in accordance with the first model of this invention. FIGS. 3 and 4 are drawings of the perspective view and the cross section of the vehicle tent in accordance with the second model of this invention. FIG. 5 is a drawing of the fixed structure of the open-close sheet of the vehicle tent in accordance with this invention. FIG. 6 or FIG. 9 are drawings of the installed vehicle tent in accordance with the second model of this invention. FIG. 10 is a drawing to describe the structure of the waterproof sheet in accordance with the third model of this invention. FIG. 11 is a perspective view of the vehicle tent in accordance with the fourth model of this invention.

As illustrated in FIGS. 1 and 2a, the vehicle tent 110 of this invention includes the waterproof sheet 110, tent fastening device 120, blocking sheet 130, and the open-close sheet 140.

The waterproof sheet 110 makes up the outer cover of the vehicle tent, blocking the entry of rain water or sunlight into the tent.

This waterproof sheet 110 is formed in a shape in which the rear side connected to the vehicle is open, while the front and two sides are connected to open-close sheets 140, allowing it to open and close.

Moreover, the waterproof sheet 110 is embedded along the rim of the opening part on the rear side, and is composed of tent fastening devices 120 that made up of the fixed end 118 of the waterproof sheet 110, where with predetermined elastic force, the vehicle tent may be connected with vehicle.

At the same time, the two sides of the waterproof sheet 110 of this invention is further composed of fastening component that acts to maintain solid attachment between the waterproof sheet 110 and the rear panel 20.

The fastening component is composed of the slit parts 112 that are formed as the two sides of the waterproof sheet 110 are partially cut, and the fastening straps 114 formed on each side of these slit parts 112, including the adjustment component 116 to adjust the length of the fastening straps 114. When the waterproof sheet 110 is connected to the vehicle, this fastening component allows the waterproof sheet 110 to be more tightly fitted to the rear panel 20 from pulling the fastening strap 114 using the adjustment component 116, which then provides predetermined fixing force together with the fastening device 120 of the tent.

The tent fastening device 120 is composed of an elastic body made up of rubber, and embedded in the tip of the opening part of the rear side of the waterproof sheet 110. It also acts as a connecting device for the waterproof sheet 110 to be connected to the rear door 10, rear panel 20 and bumper panel 30.

Therefore, this invention will allow men and women of all ages to easily install and remove the vehicle tent as the vehicle tent in this invention may be connected to the vehicle without the need for separate fastening devices, using only the elastic force.

When installed, the upper surface of the waterproof sheet 110 of this invention settles on the top surface of the rear door 10, making the tent fastening device 120 at the upper surface of the opening part at the back to cover the rear surface of the rear door 10, simultaneously, and is inserted and combined in the panel that makes up the rear door 10. The two sides of the waterproof sheet 110 adheres to the outer surface of the rear panel 20, and are inserted and combined in between the gaps of the rear panels 20. The bottom surface covers the bumper panel 30, and is inserted and combined in the inner surface of the bumper panel 30.

In other words, the waterproof sheet 110 of this invention are connected to all the rear door 10, end side of the rear panel 20, and the bumper panel 30 of the vehicle, allowing the vehicle and the vehicle tent to tightly connect to each other, simultaneously maintaining its attachment for long hours.

As illustrated in FIG. 10, the waterproof sheet 110 in this invention may have an exposed groove 190. The exposed groove 190 of the waterproof sheet 110 may expose part of the vehicle body where the vehicle tent is installed. Based on one of the models of this invention, there can be multiple numbers of the exposed groove 190, and because of the exposed groove, the tail lamp 195 of the vehicle may be exposed outside.

Accordingly, even with the vehicle tent installed on the vehicle, the tail lamp 195 of the vehicle may continuously be utilized. The dark space outside of the vehicle can be effectively recognized through the light emitted from the inside of the vehicle tent sourced from the tail lamp 195.

Furthermore, as illustrated in FIG. 11, the waterproof sheet 110 in this invention may include a canopy 180.

The canopy 180 may be partnered with the window of the rear door 10; as illustrated in FIG. 2b. Specifically, the canopy 180 may be placed overlapping the rear door 10 of the vehicle.

The canopy 180 contains urethane and can improve the thermal insulation inside the vehicle tent.

The canopy 180 may be transparent, in such case, the canopy 180 overlaps the window of the rear door of the vehicle, allowing the effective recognition of the outside space from the inside of the vehicle tent through the canopy 180.

Furthermore, the waterproof sheet 110 is completely transparent and contains urethane, increasing the thermal insulation of the inside of the vehicle installed with the vehicle tent.

As illustrated in FIG. 2a, the front and back of the blocking sheet 130 are both formed to penetrate into the tent, and composes the inner part of the waterproof sheet 110, thus blocking rain water and such from entering through the gap between the vehicle and the vehicle tent.

Such blocking sheet 130 may be connected to the rear side of the opening part of the waterproof sheet 110 in manners such as sewing, and may consist additional tent fastening devices 120 in order for the blocking sheet 130 to tightly connect to the front end of the waterproof sheet 110.

As such, the upper surface of the blocking sheet 130 of this invention, as illustrated in FIG. 2b, is inserted in the gap between the rear door 10 and the rear panel 20, covering the outer side of the rear panel 20. Furthermore, the two sides of the blocking sheet 130 covers the outer part of the sides of the rear panel 20. The bottom surface covers the bottom part of the rear panel 20 and the upper surface of the bumper panel 30. This completely seals the gap between the vehicle panel 30 and the vehicle tent that connects the space inside and outside of the vehicle tent.

However, the functions are not limited thereto. As illustrated in FIGS. 3 and 4, the blocking sheet forms the inner surface of the entire waterproof sheet 110, and may be sealed inside the waterproof sheet 110 using methods such as thermosetting. It may also be formed to extend longer than the tip of the rear side of the opening part of the waterproof sheet 110.

Figure 7:
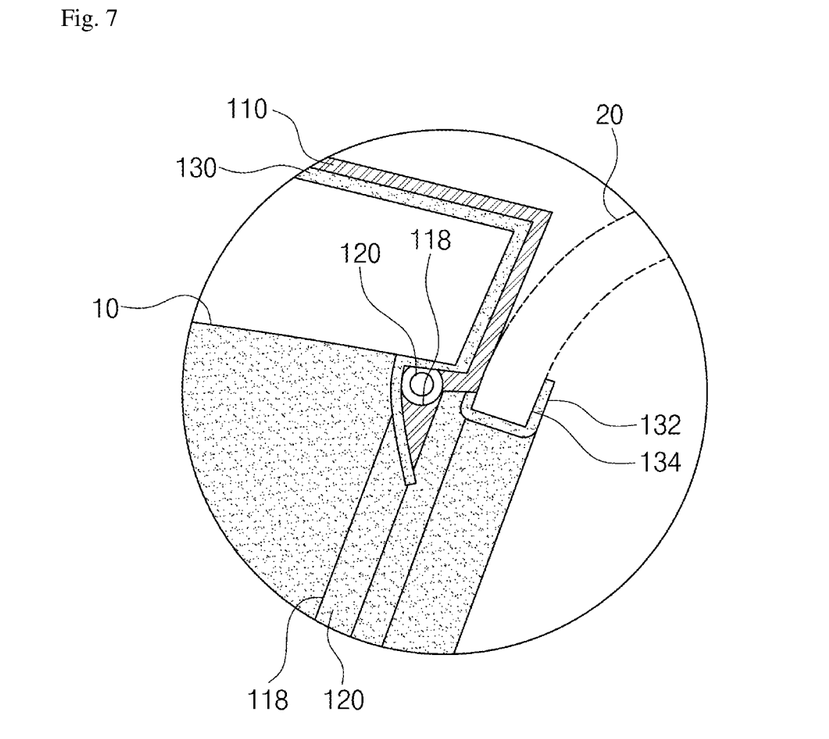
FIG. 7 is an enlarged view of an extended sheet of the vehicle tent, when installed in accordance with the second model of this invention.
Figure 8:
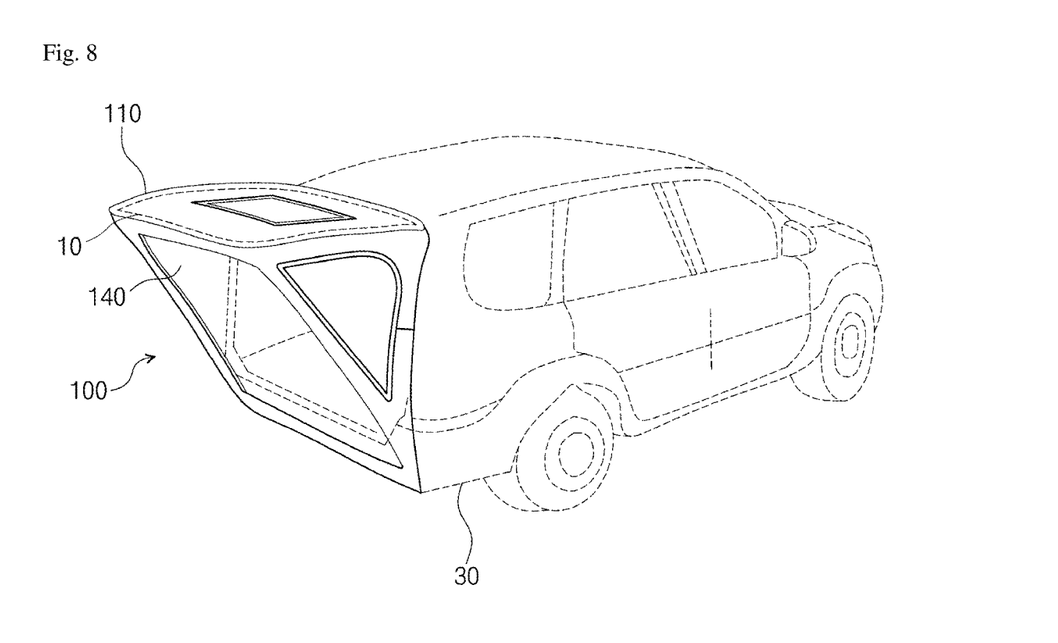
FIGS. 8 and 9 illustrate the installed vehicle tent in accordance with the second model of the invention.

In such case, there can be an extended sheet 132 coming down from the blocking sheet 130 on the upper surface of the opening part. This extended sheet 132 as illustrated in FIGS. 6 and 7, is inserted in the gap between the rear door 10 and the rear panel 20, being attachable and detachable from the borders of the front side of the rear panel. In other words, it can be attached and detached in the inner borders of the rear sides of the vehicle when the rear door is open 10. This can not only block the rain water from entering the vehicle tent, but into the vehicle as well.

In such case, there will be additional attachment devices 134 in the extended sheet 134 that it may be attached and detached on the rear panel 20 of the vehicle. This attachment devices 134 may be made up of commercial velcro tapes, but not limited to such.

Therefore, when the blocking sheet 130 is connected inside of entire waterproof sheet 110, the blocking sheet 130 is also secured as the tent fastening devices 120 are connected to each of the panels of the vehicle 10, 20, 30, making the installment of the vehicle tent much easier.

The open-close sheet 140 comprises of the front of the waterproof sheet 110 or both the front and the two sides. The top surface is connected to the waterproof sheet 110, while the two sides and the bottom surface are connected to the open-close devices, allowing the sheet to open and close with the waterproof sheet 110.

Here, the open-close sheet 140 may comprise to open and close with the waterproof sheet 110 using the open-close device 142. The open-close device 142 may comprise of a commercial component such as a zipper or Velcro tape.

Such open-close sheet 140 may be a commercial insect screen, but not limited to such.

In other words, the open-close sheet 140 in this invention may be of the same material as the waterproof sheet 110 of this invention. A mesh type of insect screen 150 and shade canopy 160 may be individually connected inside the open-close sheet and be connected to open and close using the open-close device 142. That is, the open-close sheet 140 may be placed on the outermost side with the insect screen 150 and shade canopy 160 inside of it. However, the positioning is not limited to such, and the order of the position of the open-close sheet 140, insect screen 150 and shade canopy 160 can be variously modified. For example, the insect screen 150 may be positioned in the outermost side, and the open-close sheet 140 in the innermost side. The shade canopy 160 may be positioned in the outermost side while the insect screen 150 may be positioned in the inner most side.

Furthermore, although not illustrated in the drawing, the shade canopy 160 may be replaced with a transparent cover not illustrated. In such case, the function of the shade canopy 160 can be performed by the open-close sheet 140. For this, the user needs to secure the open-close sheet 140 in foundations around the vehicle e.g. trees to form the shade canopy.

The transparent cover may be made of a transparent material. One model of this invention may include transparent urethane for the transparent cover. The transparent cover may be positioned in the innermost side. One model of this invention may place the open-close sheet 140 in the outermost part, and the insect screen 150 in between the transparent cover and the open-close sheet 140. However, the positioning is not limited to such and the order of the position of the open-close sheet 140, insect screen 150, and transparent cover may be variously modified.

Likewise, the transparent cover contains urethane that increases the thermal insulation in the vehicle tent, and the outside of the vehicle can be recognized even without having to open the transparent cover. The user may independently remove any of the open-close sheet 140, insect screen 150, and shade canopy 160 from the waterproof sheet 110, not only providing convenience in the use of the vehicle tent, but also provide diversity in the use of the vehicle tent depending on the weather.

For example, on a hot weather, the open-close sheet 140 and shade canopy 160 can be removed from the waterproof sheet 110 for outside air to flow in, or have the shade canopy 160 removed from the waterproof sheet 110 in order to form shade canopy around the vehicle tent.

However, the functions are not limited to such. The insect screen 150 and shade canopy 160 may be connected to open and close with the open-close sheet 140 using the open-close devices 140.

Accordingly, depending on the choice of the user, the open-close sheet 140 may be separated from the waterproof sheet 110, or the insect screen 150 and the shade canopy 160 may be separated as well, allowing the open-close function to be performed easily.

In addition, the open-close sheet 140 of this invention, as illustrated in FIG. 5, may expand the inner space of the vehicle tent by keeping the open-close sheet 140 open.

In such case, the open-close sheet 140 may comprise of connectors 210 that connects the end of the waterproof sheet 110 and the end of the open-close sheet 140 to keep the open-close sheet 140 open.

The connectors 210 make up part of bottom part of the outer surface of the open-close sheet 140, and includes wire roller that coils and uncoils the connecting wires 212 connected to the waterproof sheet 110.

Furthermore, the connectors 210 of this invention comprises the tip of the waterproof sheet 110, and includes connecting buttons 214 that connect the end of the uncoiled wire from the wire roller.

Accordingly, in order to maintain the open state of the open-close sheet 140, the connecting wire 212 should be uncoiled from the wire roller by a predetermined length and the end of the connecting wire 212 should be connected with the connecting button 214 so that the tension of the connecting wire can keep the open-close sheet 140 in an open state.

In addition, the open-close sheet 140 maintaining the open state exhibits predetermined supporting force, where as illustrated in FIG. 9, a large tent may be further connected to expand the inner space of the vehicle tent.

Furthermore, although not illustrated in the Drawings, according to another model made for the vehicle tent of this invention, the waterproof sheet does not cover the rear door of the vehicle, but it can be in the form of being connected to the rear frame of the vehicle when the rear door is open.

The rear frame may include the rear panel 20 and bumper panel 30. Accordingly, the waterproof sheet is not positioned in the outermost part upon installation, nor in contact or connected to the rear door 10, but may be positioned between the rear door 10 and the rear frame.

When the vehicle tent is installed in the manner stated above, the installation process will become simpler and more convenient compared to the installation of the vehicle tent 100 explained through FIG. 1 and FIG. 2*a*.

The other compositions shall be omitted as it has been explained in detail in FIG. 1 and FIG. 2*a*. The large tent connected to the vehicle tent of this invention, is a type of tent that may also be installed on the vehicle, and requires additional supports upon installation.

It is to be understood that the terms "includes", "comprises of", or "makes up" and others, as used in the foregoing descriptions, mean that a certain component may be embedded unless specifically stated to the contrary. It should be understood that this does not mean to exclude other components but rather further includes the other component. All terms that include technical or scientific term have the same meaning as commonly understood by one with ordinary knowledge of the technical field to which this invention belongs, unless otherwise defined.

Furthermore, the foregoing description is an illustrative explanation of the technological idea of this invention. One with a general knowledge in the technical field to which this invention belongs may make various modifications and variations without departing from the essential features of this invention. Accordingly, the models made for this invention are not to limit the technical idea of this invention, but rather to describe the same. These models are not to limit the scope of the technical ideas of this invention. The scope of protection of this invention should be interpreted in accordance with the scope of claim below, and should further be interpreted that the all technical ideas within the same scope shall be included in the scope of rights of this invention.

What is claimed is:

1. A vehicle tent comprising;
a waterproof sheet that makes up an outer cover of the vehicle tent, comprising a top panel, two sides panel, a first opening part, and a second opening part opposite to the first opening part, wherein the first opening part is adapted to be connected to a rear door, rear panel, and rear bumper panel of a vehicle;
tent fixture devices that are embedded at a periphery of the first opening part so as to attach the periphery of the first opening part to and enclose around a rear portion of the vehicle with rear door opened upwardly, by an elastic force, wherein the top panel covers a back surface of the rear door when it is opened upwardly, an upper periphery of the first opening part is adapted to be inserted and combined to the rear door, two side peripheries of the first opening part are adapted to be inserted and combined to a gap formed at sides of the rear panel, and a bottom periphery of the first opening part is adapted to be inserted and combined to inner side of the bumper panel;
a blocking sheet that is connected to entire periphery of the first opening part of the waterproof sheet and forms at least partially interior surface of the tent, wherein a part of the blocking sheet connected to the upper periphery is adapted to be inserted to a gap between the rear door and rear panel, where parts of the blocking sheet connected to the sides peripheries are adapted to cover the sides of the rear panel, and where a part of the blocking sheet connected to the bottom periphery is adapted to cover a bottom surface of the rear panel and an upper surface of the bumper panel;

an open-close sheet which is adapted to cover and open the second opening part of the waterproof sheet, wherein a top part of the open-close sheet is connected to the waterproof sheet above the second opening part, and, wherein two sides and a bottom surface of the open-close sheet are provided with an open-close device allowing it to open and close; and an insect screen and a shade canopy detachably attached to the open-close sheet.

2. The vehicle tent of claim 1, further comprising an extended sheet extended from the blocking sheet, said extended sheet being adapted to be inserted in the gap between the rear door and the rear panel, therefore the extended sheet can be attached and detached from the borders of a tip of the rear panel; and an attachment devices for the extended sheet.

3. The vehicle tent of claim 1, wherein one of the open-close sheet, the insect screen, or the shade canopy can be opened or closed independently, or the open-close sheet, the insect screen and the shade canopy can be opened or closed simultaneously.

4. The vehicle tent of claim 1, wherein the open-close sheet comprises connectors connecting its bottom part to an end of the top panel of the waterproof sheet, wherein the connectors comprise a wire roller wherein a connecting wire connected to the end of the top panel of the waterproof sheet is capable of being coiled and uncoiled, thereby the open-close sheet is lifted when the connecting wire is coiled.

5. The vehicle tent of claim 1, wherein the waterproof sheet comprises a window canopy, wherein the window canopy is placed overlapping a window of the rear door, and wherein the window canopy is transparent in color and contains urethane.

6. The vehicle tent of claim 1, wherein an exposure groove is formed at the waterproof sheet, exposing a part of the vehicle body, wherein the part is a backlight of the vehicle.

7. A vehicle tent comprising;

a waterproof sheet that makes up an outer cover of the vehicle tent, comprising a top panel, two sides panel, a first opening part, and a second opening part opposite to the first opening part, wherein the first opening part is adapted to be connected to a rear door, rear panel, and rear bumper panel of a vehicle;

tent fixture devices that are embedded at a periphery of the first opening part so as to attach the periphery of the first opening part to and enclose around a rear portion of the vehicle with rear door opened upwardly, by elastic force wherein the top panel covers a back surface of the rear door when it is opened upwardly, an upper periphery of the first opening part is adapted to be inserted and combined to the rear door, two side peripheries of the first opening part are adapted to be inserted and combined to a gap formed at sides of the rear panel, and a bottom periphery of the first opening part is adapted to be inserted and combined to inner side of the bumper panel;

a blocking sheet that forms an internal surface of the vehicle tent and having extended parts along entire periphery of the first opening part of the waterproof sheet, wherein the extended part of the blocking sheet connected to the upper periphery is adapted to be inserted to a gap between the rear door and rear panel, where the extended parts of the blocking sheet connected to the sides peripheries are adapted to cover the sides of the rear panel, and where the extended part of the blocking sheet connected to the bottom periphery is adapted to cover a bottom surface of the rear panel and an upper surface of the bumper panel;

an open-close sheet which is adapted to cover and open the second opening part of the waterproof sheet, wherein a top part of the open-close sheet is connected to the waterproof sheet above the second opening part, and, wherein two sides and a bottom surface of the open-close sheet are provided with an open-close device allowing it to open and close; and an insect screen and a transparent cover detachably attached to the open-close sheet.

8. The vehicle tent of claim 7, wherein the insect screen is in the form of mesh, the transparent cover comprises a urethane, the open-close sheet is located at the outermost side among the open-close sheet, the insect screen and the transparent cover, and the transparent cover is located between the open-close sheet and the insect screen.

9. The vehicle tent of claim 7, wherein the insect screen is in the form of mesh, the transparent cover comprises a urethane, the transparent cover is located at the outermost side among the open-close sheet, the insect screen and the transparent cover, and the open-close sheet is located between the insect screen and the transparent cover.

10. The vehicle tent of claim 7, wherein the insect screen is in the form of mesh, the transparent cover comprises a urethane, and the waterproof sheet comprise a urethane.

11. The vehicle tent installed in a vehicle, wherein the vehicle comprises a rear door and a rear frame connected to the rear door, the rear frame comprises a rear panel and a bumper panel, the vehicle tent comprising, a waterproof sheet that makes up an outer cover of the vehicle tent, comprising a top panel, two sides panel, a first opening part, and a second opening part opposite to the first opening part, wherein the first opening part is adapted to be connected to a rear door, rear panel, and rear bumper panel of a vehicle;

tent fixture devices that are embedded at a periphery of the first opening part so as to attach the periphery of the first opening part to and enclose around a rear portion of the vehicle with rear door opened upwardly, by elastic force, wherein the top panel covers a back surface of the rear door which is opened upwardly, an upper periphery of the first opening part is adapted to be inserted and combined to the rear door, two side peripheries of the first opening part are adapted to be inserted and combined to a gap formed at sides of the rear panel, and a bottom periphery of the first opening part is adapted to be inserted and combined to inner side of the bumper panel;

a blocking sheet that is connected to entire periphery of the first opening part of the waterproof sheet and forms at least partially interior surface of the vehicle tent, wherein a part of the blocking sheet connected to the upper periphery is adapted to be inserted to a gap between the rear door and rear panel, where parts of the blocking sheet connected to the sides peripheries are adapted to cover the sides of the rear panel, and where a part of the blocking sheet connected to the bottom periphery is adapted to cover a bottom surface of the rear panel and an upper surface of the bumper panel; and an open-close sheet which is adapted to cover and open the second opening part of the waterproof sheet, wherein a top part of the open-close sheet is connected to the waterproof sheet above the second opening part, and, wherein two sides and a bottom surface of the open-close sheet are provided with an open-close device allowing it to open and close; and an insect screen and/or a shade canopy detachably attached to the open-close sheet.

* * * * *